(12) United States Patent
Kim et al.

(10) Patent No.: US 11,710,840 B2
(45) Date of Patent: Jul. 25, 2023

(54) CARBON DIOXIDE UTILIZATION SYSTEM, AND COMPLEX POWER GENERATION SYSTEM USING THE SAME

(71) Applicant: GT Co., Ltd., Ulsan (KR)

(72) Inventors: Guntae Kim, Ulsan (KR); Changmin Kim, Ulsan (KR); Jeongwon Kim, Ulsan (KR)

(73) Assignee: GT Co., Ltd., Ulsan (KR)

( * ) Notice: Subject to any disclaimer, the term of this patent is extended or adjusted under 35 U.S.C. 154(b) by 505 days.

(21) Appl. No.: 16/976,604

(22) PCT Filed: Mar. 13, 2019

(86) PCT No.: PCT/KR2019/002896
§ 371 (c)(1),
(2) Date: Aug. 28, 2020

(87) PCT Pub. No.: WO2019/182284
PCT Pub. Date: Sep. 26, 2019

(65) Prior Publication Data
US 2021/0005911 A1 Jan. 7, 2021

(30) Foreign Application Priority Data

Mar. 19, 2018 (KR) .......................... 10-2018-0031433
May 9, 2018 (KR) .......................... 10-2018-0053240
(Continued)

(51) Int. Cl.
*H01M 8/04* (2016.01)
*H01M 8/0662* (2016.01)
(Continued)

(52) U.S. Cl.
CPC ............. *H01M 8/0662* (2013.01); *C01B 3/38* (2013.01); *C25B 1/02* (2013.01); *C25B 9/19* (2021.01);
(Continued)

(58) Field of Classification Search
CPC ...................................................... H01M 8/04
See application file for complete search history.

(56) References Cited

U.S. PATENT DOCUMENTS

2014/0065054 A1* 3/2014 Noyes .................... A62B 13/00
422/120
2017/0137951 A1* 5/2017 Xie ........................ H01M 4/926

FOREIGN PATENT DOCUMENTS

JP 2011-228162 A 11/2011
KR 10-2001-0074336 A 8/2001
(Continued)

OTHER PUBLICATIONS

International Search Report for PCT/KR2019/002896 dated Jul. 9, 2019 from Korean Intellectual Property Office.
(Continued)

*Primary Examiner* — Jacob B Marks
(74) *Attorney, Agent, or Firm* — Paratus Law Group, PLLC (57) ABSTRACT

Disclosed is a carbon dioxide utilization system capable of recharging and undergoing reactions. The system includes a cathode unit provided with a first aqueous solution accommodated in a first accommodation space, and a cathode at least a part of which is submerged in the first aqueous solution; an anode unit provided with an alkaline second aqueous solution accommodated in a second accommodation space, and a metal anode at least a part of which is submerged in the second aqueous solution; and a connection unit provided with a connection channel connecting the first
(Continued)

and second accommodation spaces in open communication, and a porous ion transfer member, disposed in the connection channel, for blocking the movement of the first and second aqueous solutions but allowing the movement of ions.

39 Claims, 5 Drawing Sheets

(30) Foreign Application Priority Data

| Jun. 4, 2018 | (KR) | ............... 10-2018-0064189 |
|---|---|---|
| Aug. 17, 2018 | (KR) | ............... 10-2018-0096113 |
| Nov. 19, 2018 | (KR) | ............... 10-2018-0142494 |
| Nov. 19, 2018 | (KR) | ............... 10-2018-0142495 |

(51) Int. Cl.

| *H01M 8/2457* | (2016.01) |
|---|---|
| *C25B 11/057* | (2021.01) |
| *C25B 9/19* | (2021.01) |
| *C01B 3/38* | (2006.01) |
| *C25B 1/02* | (2006.01) |
| *H01M 8/0612* | (2016.01) |
| *H01M 8/2425* | (2016.01) |
| *H01M 16/00* | (2006.01) |
| *H01M 8/12* | (2016.01) |

(52) U.S. Cl.
CPC ......... *C25B 11/057* (2021.01); *H01M 8/0618* (2013.01); *H01M 8/2425* (2013.01); *H01M 8/2457* (2016.02); *H01M 16/003* (2013.01); *C01B 2203/0233* (2013.01); *C01B 2203/066* (2013.01); *C01B 2203/1241* (2013.01); *H01M 2008/1293* (2013.01)

(56) References Cited

FOREIGN PATENT DOCUMENTS

| KR | 10-2011-0114816 A | 10/2011 |
|---|---|---|
| KR | 10-2015-0020463 A | 2/2015 |
| KR | 10-2015-0091834 A | 8/2015 |
| KR | 10-2016-0136703 A | 11/2016 |
| RU | 2 420 345 C2 | 6/2011 |
| RU | 2 569 093 C2 | 11/2015 |
| WO | WO 2015/026393 A1 | 2/2015 |

OTHER PUBLICATIONS

Russian Office Action for related RU Application No. 2021126551/07(056050) dated Apr. 1, 2022 from Russian Intellectual Property Office.

\* cited by examiner

CARBON DIOXIDE UTILIZATION SYSTEM, AND COMPLEX POWER GENERATION SYSTEM USING THE SAME

CROSS-REFERENCE TO PRIOR APPLICATIONS

This application is a National Stage Patent Application of PCT International Patent Application No. PCT/KR2019/002896 (filed on Mar. 13, 2019) under 35 U.S.C. § 371, which claims priority to Korean Patent Application Nos. 10-2018-0031433 (filed on Mar. 19, 2018), 10-2018-0053240 (filed on May 9, 2018), 10-2018-0064189 (filed on Jun. 4, 2018), 10-2018-0096113 (filed on Aug. 17, 2018), 10-2018-0142495 (filed on Nov. 19, 2018), and 10-2018-0142494 (filed on Nov. 19, 2018), which are all hereby incorporated by reference in their entirety.

BACKGROUND

The present invention relates to a carbon dioxide utilization system and a complex power generation system including the same.

Recently, the emission of greenhouse gases is continuously increasing with industrialization, and carbon dioxide accounts for the largest proportion of greenhouse gases. According to the type of industry, the emission of carbon dioxide is highest in energy supply sources such as power plants and the like, and carbon dioxide generated in the cement/steel/refining industries, including power generation, accounts for half of the world's carbon dioxide generation. The conversion/utilization fields of carbon dioxide are roughly classified into chemical conversion, biological conversion, and direct utilization, and the technical categories can be classified into catalysts, electrochemical processes, bioprocesses, light utilization, mineralization (carbonation), polymers, and the like. Since carbon dioxide is generated in various industries and processes, and it is not possible to achieve carbon dioxide reduction with one technology, various approaches for reducing carbon dioxide are required.

Currently, the Department of Energy (DOE) of the United States is pursuing the development of diversified technology with interest in CCUS technology that is a combination of carbon capture & storage (CCS) and carbon capture & utilization (CCU) as a technology of reducing carbon dioxide. Although the CCUS technology is recognized as an effective greenhouse gas reduction method, it faces the problems of high investment costs, the possibility of emission of harmful capturing agents to the atmosphere, and low technology readiness level. In addition, in view of energy and climate policies, the CCUS technology provides a means to substantially reduce the emission of greenhouse gases, but there are many supplementary points for realizing the technology. Therefore, there is a need to develop a new concept of breakthrough technology for more efficiently capturing, storing, and utilizing carbon dioxide.

As a prior patent document related to the technical field of the present invention, Korean Laid-Open Patent Publication No. 10-2015-0091834 discloses a carbon dioxide utilization system which captures carbon dioxide using sodium.

SUMMARY

The present invention is directed to providing a system that utilizes carbon dioxide, which is a greenhouse gas, through a spontaneous electrochemical reaction without using a separate power source.

The present invention is also directed to providing a carbon dioxide utilization system capable of producing high purity hydrogen, which is an environmentally friendly fuel, by utilizing carbon dioxide.

The present invention is also directed to providing a carbon dioxide utilization system capable of capturing carbon dioxide as bicarbonate ions.

The present invention is also directed to providing a complex power generation system including the above-described carbon dioxide utilization system.

One aspect of the present invention provides a carbon dioxide utilization system which includes: a cathode unit including a first accommodation space, a first aqueous solution, and a cathode at least partially submerged in the first aqueous solution; an anode unit including a second accommodation space, a second aqueous solution which is basic, and a metal anode at least partially submerged in the second aqueous solution; and a connection unit configured to connect the cathode unit and the anode unit, wherein carbon dioxide introduced into the first aqueous solution is captured as a bicarbonate ion and produces a hydrogen ion, and the hydrogen ion reacts with an electron of the cathode to produce hydrogen.

Another aspect of the present invention provides a carbon dioxide utilization system which includes: a reaction space which accommodates an aqueous solution; a cathode at least partially submerged in the aqueous solution in the reaction space; and a metal anode at least partially submerged in the aqueous solution in the reaction space, wherein carbon dioxide introduced into the aqueous solution is captured as a bicarbonate ion and produces a hydrogen ion, and the hydrogen ion reacts with an electron of the cathode to produce hydrogen.

Still another aspect of the present invention provides a complex power generation system which includes: a carbon dioxide utilization system which generates hydrogen by using carbon dioxide as a fuel; a reformer which produces hydrogen-rich reformed gas from a hydrogen-containing fuel and generates carbon dioxide as a by-product; a fuel cell which receives the reformed gas produced in the reformer as a fuel; and a carbon dioxide supply unit configured to supply the carbon dioxide generated in the reformer to the carbon dioxide utilization system.

Yet another aspect of the present invention provides a complex power generation system which includes: a carbon dioxide utilization system which generates hydrogen by using carbon dioxide as a fuel; a reformer which produces hydrogen-rich reformed gas from a hydrogen-containing fuel; a fuel cell which receives the reformed gas produced in the reformer as a fuel; and a hydrogen supply unit configured to additionally supply the hydrogen generated in the carbon dioxide utilization system as a fuel of the fuel cell.

Yet another aspect of the present invention provides a complex power generation system which includes: a carbon dioxide utilization system which generates hydrogen by using carbon dioxide as a fuel; a reformer which produces hydrogen-rich reformed gas from a hydrogen-containing fuel and generates carbon dioxide as a by-product; a fuel cell which receives the reformed gas produced in the reformer as a fuel; a carbon dioxide supply unit configured to supply the carbon dioxide generated in the reformer to the carbon dioxide utilization system; and a hydrogen supply unit configured to additionally supply the hydrogen generated in the carbon dioxide utilization system as a fuel of the fuel cell.

According to the present invention, all the above-described objectives of the present invention can be achieved. Specifically, electricity, hydrogen, and bicarbonate ions can be produced by using various metals and utilizing carbon dioxide through a spontaneous electrochemical reaction without using a separate external power source.

In addition, since a carbon dioxide treatment unit configured to prevent carbon dioxide not dissolved in an aqueous solution from being supplied to a cathode unit is provided, high purity hydrogen can be produced in the cathode unit during discharging.

Additionally, since a carbon dioxide utilization system which generates hydrogen by using carbon dioxide generated in a hydrocarbon fuel cell as a raw material and a hydrogen fuel cell which uses hydrogen generated in a secondary battery as a fuel are combined, electrical energy can be efficiently produced by utilizing carbon dioxide.

DETAILED DESCRIPTION

Hereinafter, the configuration and operation process of embodiments of the present invention will be described in detail with reference to the accompanying drawings.

Figure 1:
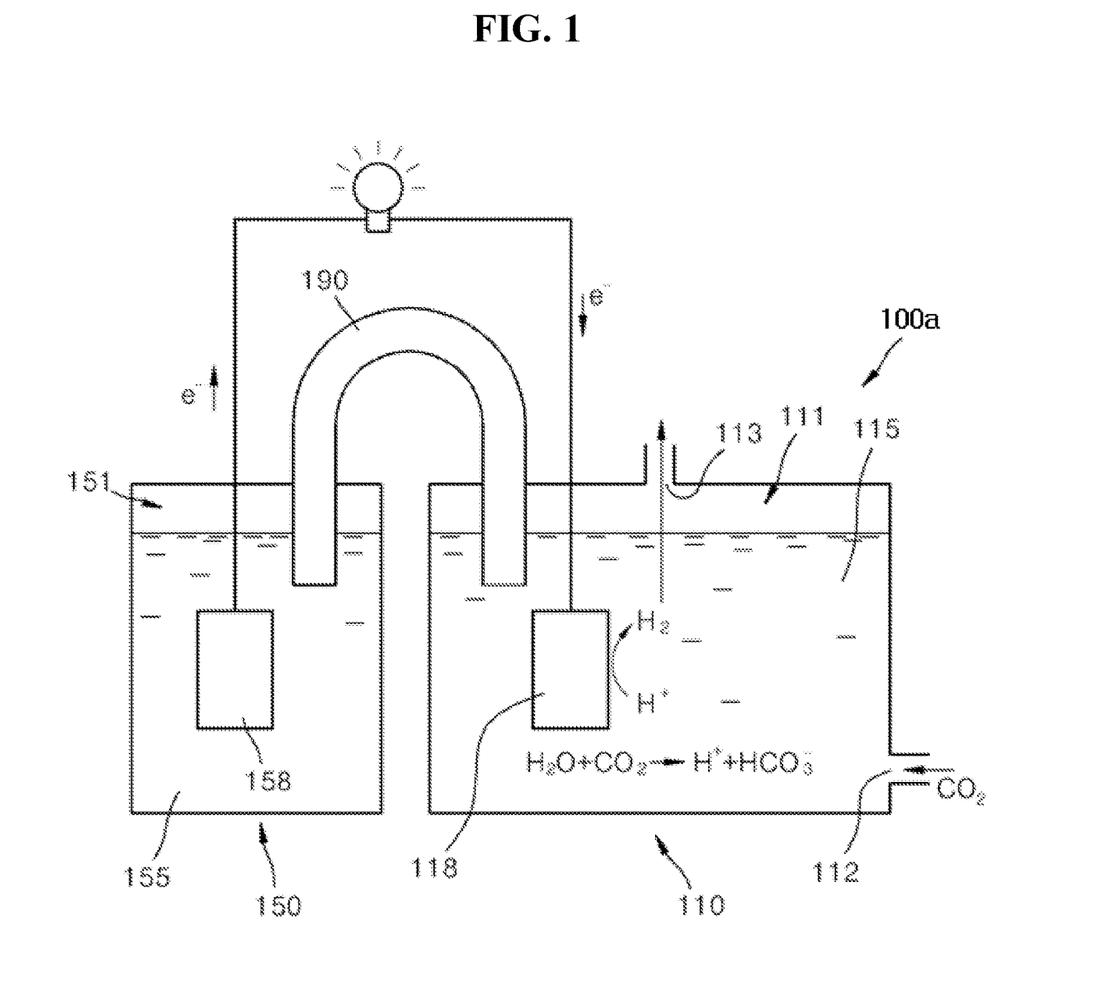
FIG. 1 is a schematic diagram illustrating the operation process of a carbon dioxide utilization system according to an embodiment of the present invention.

FIG. 1 shows the configuration of a carbon dioxide utilization system according to an embodiment of the present invention. Referring to FIG. 1, a carbon dioxide utilization system 100a according to an embodiment of the present invention includes a cathode unit 110, an anode unit 150, and a connection unit 190 configured to connect the cathode unit 110 and the anode unit 150. The connection unit 190 may be a salt bridge. The carbon dioxide utilization system 100a uses carbon dioxide gas ($CO_2$), which is a greenhouse gas, as a raw material in a spontaneous oxidation and reduction reaction and produces hydrogen ($H_2$) which is an environmentally friendly fuel.

The cathode unit 110 includes a first aqueous solution 115 contained in a first accommodation space 111 and a cathode 118 at least partially submerged in the first aqueous solution 115. As the first aqueous solution 115, an alkaline aqueous solution (in an embodiment of the present invention, one obtained by eluting $CO_2$ in a strong basic solution of 1 M KOH is used), seawater, tap water, distilled water, and the like may be used. The cathode 118 is an electrode for forming an electric circuit and may be carbon paper, a carbon fiber, carbon felt, carbon cloth, metal foam, a metal thin film, or a combination thereof, and a platinum catalyst may also be used. In the case of a catalyst, in addition to a platinum catalyst, all other catalysts that are generally usable as a catalyst for a hydrogen evolution reaction (HER), such as carbon-based catalysts, carbon-metal-based complex catalysts, and perovskite oxide catalysts, and the like, may also be used. In the cathode unit 110, a first inlet 112 and a first outlet 113, both of which communicate with the first accommodation space 111, are formed. The first inlet 112 is positioned at a lower part of the first accommodation space 111 so that it is positioned below a water surface of the first aqueous solution 115. The first outlet 113 is positioned at an upper part of the first accommodation space 111 so that it is positioned above a water surface of the first aqueous solution 115. Through the first inlet 112, carbon dioxide to be used as a fuel in a reaction process is introduced into the first accommodation space 111, and, as necessary, the first aqueous solution 115 may also be introduced. Through the first outlet 113, the gas produced in a reaction process is discharged to the outside. Although not shown, a valve or the like is provided so that the inlet 112 and the outlet 113 may be selectively opened and closed by the valve or the like during charging and a reaction in a timely manner. In the cathode unit 110, an elution reaction of carbon dioxide occurs during a reaction process.

The anode unit 150 includes a second aqueous solution 155 contained in a second accommodation space 151 and an anode 158 at least partially submerged in the second aqueous solution 155. As the second aqueous solution 155, a high concentration alkaline solution is used, and, for example, 1 M KOH or 6 M KOH may be used. The anode 158 is a metal electrode for forming an electric circuit, and, in an embodiment, it is described that zinc (Zn) or aluminum (Al) is used as the anode 158. In addition, a Zn- or Al-containing alloy may be used as the anode 158.

Both ends of the salt bridge (connection unit 190) are submerged in the first aqueous solution 115 and the second aqueous solution 155, respectively. As a solution inside the salt bridge, a solution that is typically used as a solution inside a salt bridge, such as potassium chloride (KCl), sodium chloride (NaCl), and the like, may be used.

Hereinafter, the reaction process of the carbon dioxide utilization system 100a, the configuration of which has been described above, will be described in detail. FIG. 1 also shows the reaction process of the carbon dioxide utilization system 100a. Referring to FIG. 1, carbon dioxide is injected into the first aqueous solution 115 through the inlet 112, and a chemical elution reaction of carbon dioxide occurs in the cathode unit 110 as shown in the following Reaction Scheme 1.

$$H_2O\ (l) + CO_2\ (g) \rightarrow H^+\ (aq) + HCO_3^-\ (aq) \qquad \text{[Reaction Scheme 1]}$$

That is, in the cathode unit 110, the carbon dioxide ($CO_2$) supplied to the cathode unit 110 is subjected to a spontaneous chemical reaction with water ($H_2O$) of the first aqueous solution 115 to produce a hydrogen cation ($H^+$) and bicarbonate ($HCO_3^-$).

In addition, an electrical reaction occurs in the cathode unit 110 as shown in the following Reaction Scheme 2.

$$2H^+\ (aq) + 2e^- \rightarrow H_2\ (g) \qquad \text{[Reaction Scheme 2]}$$

That is, in the cathode unit 110, the hydrogen cation ($H^+$) receives an electron ($e^-$) to generate hydrogen ($H_2$) gas. The generated hydrogen ($H_2$) gas is discharged to the outside through the first outlet 113.

In addition, a complex hydrogen generation reaction occurs in the cathode unit 110 as shown in the following Reaction Scheme 3.

$$2H_2O\ (l) + 2CO_2\ (g) + 2e^- \rightarrow H_2\ (g) + 2HCO_3^-\ (aq) \qquad \text{[Reaction Scheme 3]}$$

In addition, when the anode 158 is made of zinc (Zn), an oxidation reaction occurs in the anode unit 150 as shown in the following Reaction Scheme 4.

$$Zn+4OH^-\rightarrow Zn(OH)_4^{2-}+2e^- (E^0=-1.25\ V)$$

$$Zn(OH)_4^{2-}\rightarrow ZnO+H_2O+2OH^-$$ [Reaction Scheme 4]

Therefore, when the anode 158 is made of zinc (Zn), the reaction scheme of the overall reaction occurring in a reaction process is the same as the following Reaction Scheme 5.

$$Zn+2CO_2+2H_2O+2OH^-\rightarrow ZnO+2HCO_3^-\ (aq)+H_2\ (g)$$
$$(E^0=1.25\ V)$$ [Reaction Scheme 5]

In addition, when the anode 158 is made of aluminum (Al), an oxidation reaction occurs in the anode unit 150 as shown in the following Reaction Scheme 6.

$$Al+3OH^-\rightarrow Al(OH)_3+3e^- (E^0=-2.31\ V)$$ [Reaction Scheme 6]

Therefore, when the anode 158 is made of aluminum (Al), the reaction scheme of the overall reaction occurring in a reaction process is the same as the following Reaction Scheme 7.

$$2Al+6CO_2+6H_2O+6OH^-\rightarrow 2Al(OH)_3+6HCO_3^-\ (aq)+$$
$$3H_2\ (g)\ (E^0=2.31\ V)$$ [Reaction Scheme 7]

In conclusion, as shown in Reaction Scheme 5 and Reaction Scheme 7, the hydrogen ions produced by the elution of carbon dioxide in the first aqueous solution 115 during the reaction receive electrons from the cathode 118 and are thus reduced to hydrogen gas, the hydrogen gas is discharged through the first outlet 113, and the metal anode 158 is changed into an oxide form. As the reaction proceeds, bicarbonate ions ($HCO_3^-$) are produced in the first aqueous solution 115. When a solution inside the salt bridge contains sodium ions ($Na^+$) (e.g., includes sodium chloride (NaCl)), the sodium ions are diffused from the salt bridge to balance ions, and thus the ions are present in the form of an aqueous sodium hydrogen carbonate ($NaHCO_3$) solution. Then, by drying the solution, a solid sodium carbonate product in the form of baking soda may be additionally obtained.

Figure 2:
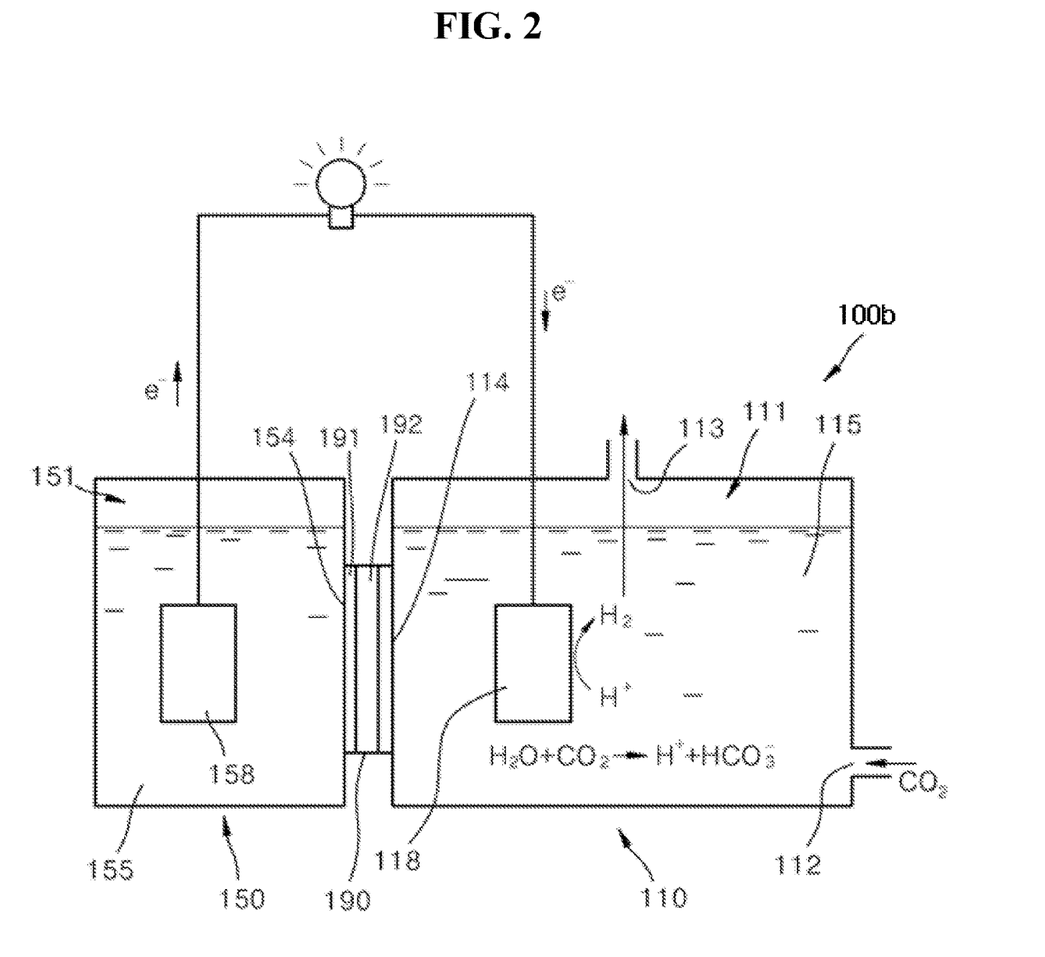
FIG. 2 is a schematic diagram illustrating the operation process of a carbon dioxide utilization system according to another embodiment of the present invention.

FIG. 2 shows the configuration of a carbon dioxide utilization system 100b according to another embodiment of the present invention. Referring to FIG. 2, the carbon dioxide utilization system 100b according to another embodiment of the present invention includes a connection unit 190 configured to connect a cathode unit 110 and an anode unit 150, and the connection unit 190 is disposed between a first accommodation space and a second accommodation space and is a porous ion transfer member which blocks the movement of a first aqueous solution and a second aqueous solution and allows the movement of ionic materials dissolved in the aqueous solutions.

The carbon dioxide utilization system 100b according to another embodiment of the present invention as shown in FIG. 2 has the same configuration as described in detail with reference to FIG. 1, except for a difference in structure of the connection unit 190 to be described below. In addition, the carbon dioxide utilization system 100b uses carbon dioxide gas as a fuel and generates hydrogen gas in a reaction process in the same manner.

In the cathode unit 110, a first inlet 112, a first outlet 113, and a first connection hole 114, all of which communicate with the first accommodation space 111, are formed. The first connection hole 114 is positioned below a water surface of the first aqueous solution 115, and the connection unit 190 is connected to the first connection hole 114. In the cathode unit 110, an elution reaction of carbon dioxide occurs during a reaction process.

In the anode unit 150, a second connection hole 154 which communicates with the second accommodation space 151 is formed. The second connection hole 154 is positioned below a water surface of the second aqueous solution 155, and the connection unit 190 is connected to the second connection hole 154.

The connection unit 190 according to an embodiment of the present invention is a porous ion transfer member and includes a connection passage 191 which connects the cathode unit 110 and the anode unit 150 and an ion transfer member 192 provided inside the connection passage 191.

The connection passage 191 is disposed between the first connection hole 114 formed in the cathode unit 110 and the second connection hole 154 formed in the anode unit 150 and allows the first accommodation space 111 of the cathode unit 110 and the second accommodation space 151 of the anode unit 150 to communicate with each other. Inside the connection passage 191, the ion transfer member 192 is provided.

The ion transfer member 192 generally has a disk shape and is provided in a form which blocks the inside of the connection passage 191. The ion transfer member 192 allows the movement of ions between the cathode unit 110 and the anode unit 150 and blocks the movement of the aqueous solutions 115, 155 therebetween due to having a porous structure. In an embodiment, the ion transfer member is described as being made of glass, but the present invention is not limited thereto, and other materials with a porous structure may also be used and are included in the scope of the present invention. In an embodiment, as the ion transfer member 192, porous glass with a pore size of 40 to 90 microns corresponding to a G2 grade, 15 to 40 microns corresponding to a G3 grade, 5 to 15 microns corresponding to a G4 grade, or 1 to 2 microns corresponding to a G5 grade may be used. Since the ion transfer member 192 transfers only ions, ionic imbalance generated in a reaction process may be solved.

Meanwhile, when an aqueous potassium hydroxide solution is used as the first aqueous solution 115 and the second aqueous solution 155, an ion transfer member 192 which blocks the movement of the first aqueous solution 115 and the second aqueous solution 155 and allows the movement of potassium ions ($K^+$) may be provided. When such an ion transfer member 192 is provided, potassium ions ($K^+$) contained in the second aqueous solution 155 move to the first aqueous solution 115 by the ion transfer member 192. As the ion transfer member 192, Nafion, which is a fluororesin-based cation exchange membrane, may be used, but the present invention is not limited thereto, and any one that allows only the movement of potassium ions ($K^+$) may be used. Since the ion transfer member 192 transfers only the ions, ionic imbalance generated in a discharging process may be solved. When the ion transfer member 192 that allows only the movement of potassium ions ($K^+$) is used as described above, potassium ions ($K^+$) contained in the second aqueous solution 155 of the anode unit 150 pass through the ion transfer member 192 and move to the first aqueous solution 115 of the cathode unit 110 during the operation of the carbon dioxide utilization system 100b, so that a change in KOH concentration due to supply of carbon dioxide may be prevented.

In addition, when an aqueous potassium hydroxide solution is used as the first aqueous solution 115 and the second aqueous solution 155, an ion transfer member 192 which blocks the movement of the first aqueous solution 115 and the second aqueous solution 155 and allows the movement of hydroxyl ions (OH⁻) may be provided. When such an ion transfer member 192 is provided, hydroxyl ions (OH⁻) contained in the first aqueous solution 115 move to the second aqueous solution 155 by the ion transfer member 192. As the ion transfer member 192, Nafion, which is a fluororesin-based cation exchange membrane may be used, but the present invention is not limited thereto, and any one that allows only the movement of hydroxyl ions (OH⁻) may be used. Since the ion transfer member 192 transfers only the ions, ionic imbalance generated in a discharging process may be solved. When the ion transfer member 192 that allows only the movement of hydroxyl ions (OH⁻) is used as described above, hydroxyl ions (OH⁻) contained in the first aqueous solution 115 of the cathode unit 110 pass through the ion transfer member 192 and move to the second aqueous solution 155 of the anode unit 150 during the operation of the carbon dioxide utilization system 100$b$, so that a change in KOH concentration due to supply of carbon dioxide may be prevented.

Figure 3:
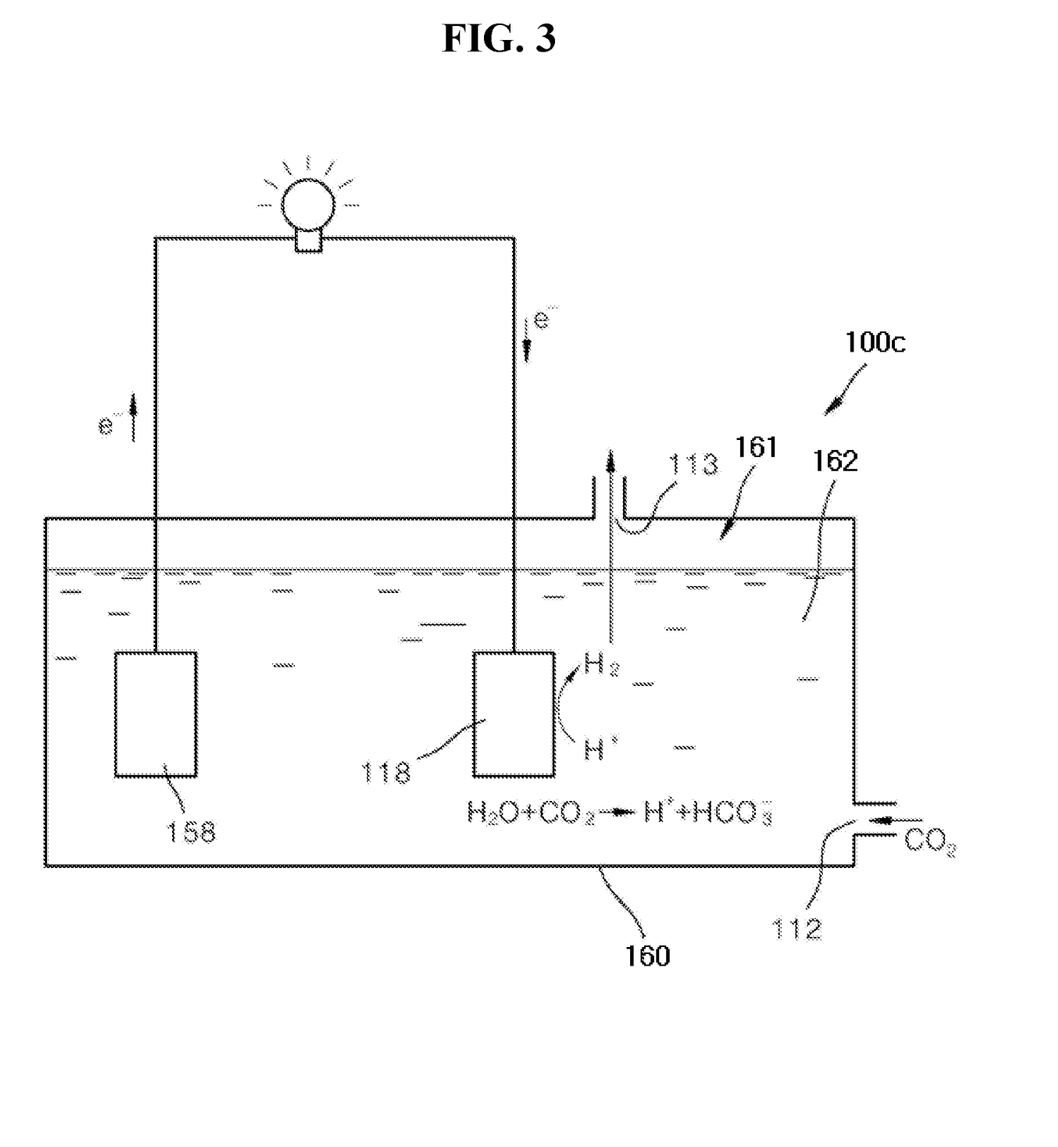
FIG. 3 is a schematic diagram illustrating the operation process of a carbon dioxide utilization system according to still another embodiment of the present invention.

FIG. 3 shows the configuration of a carbon dioxide utilization system 100$c$ according to still another embodiment of the present invention. Referring to FIG. 3, the carbon dioxide utilization system 100$c$ according to still another embodiment of the present invention includes a reaction space 161 which accommodates an aqueous solution 162, a cathode 118 at least partially submerged in the aqueous solution 162 in the reaction space 161, and a metal anode 158 at least partially submerged in the aqueous solution 162 in the reaction space 161.

A reaction vessel 160 provides the reaction space 161 which contains the aqueous solution 162 and accommodates the cathode 118 and the anode 158. In the reaction vessel 160, a first inlet 112 and a first outlet 113, both of which communicate with the reaction space 161, are formed. The first inlet 112 is positioned at a lower part of the reaction space 161 so that it is positioned below a water surface of the aqueous solution 162. The first outlet 113 is positioned at an upper part of the reaction space 161 so that it is positioned above a water surface of the aqueous solution 162. Through the first inlet 112, carbon dioxide gas to be used as a fuel in a reaction process is introduced into the reaction space 161, and, as necessary, the aqueous solution 162 may also be introduced. Through the first outlet 113, the gas produced in a reaction process is discharged to the outside. Although not shown, a valve or the like is provided so that the first inlet 112 and the first outlet 113 may be selectively opened and closed by the valve or the like during charging and a reaction in a timely manner. In the reaction space 161, an elution reaction of carbon dioxide occurs during a reaction process.

The aqueous solution 162 is contained in the reaction space 161, and at least a part of the cathode 118 and at least a part of the anode 158 are submerged in the aqueous solution 162. In an embodiment, it is described that a basic solution or seawater is used as the aqueous solution 162. The aqueous solution 162 becomes weakly acidic due to the carbon dioxide gas introduced through the first inlet 112 in a reaction process.

The cathode 118 is at least partially submerged in the aqueous solution 162 in the reaction space 161. The cathode 118 is positioned relatively closer to the first inlet 112 than the anode 158 in the reaction space 161. The cathode 118 is an electrode for forming an electric circuit and may be carbon paper, a carbon fiber, carbon felt, carbon cloth, metal foam, a metal thin film, or a combination thereof, and a platinum catalyst may also be used. In the case of a catalyst, in addition to a platinum catalyst, all other catalysts that are generally usable as a catalyst for a hydrogen evolution reaction (HER), such as carbon-based catalysts, carbon-metal-based complex catalysts, and perovskite oxide catalysts, and the like, may also be used. During a reaction, a reduction reaction occurs in the cathode 118, and accordingly, hydrogen is generated.

The anode 158 is at least partially submerged in the aqueous solution 162 in the reaction space 161. The anode 158 is positioned relatively farther from the first inlet 112 than the cathode 118 in the reaction space 161. The anode 158 is a metal electrode for forming an electric circuit, and, in an embodiment, it is described that vanadium (V), chromium (Cr), manganese (Mn), iron (Fe), cobalt (Co), nickel (Ni), copper (Cu), aluminum (Al), or zinc (Zn) is used as the anode 158. During a reaction, an oxidation reaction occurs in the anode 158 due to a weakly acidic environment.

Hereinafter, the reaction process of the carbon dioxide utilization system 100$c$, the configuration of which has been described above, will be described in detail. FIG. 3 also shows the reaction process of the carbon dioxide utilization system 100$c$. Referring to FIG. 3, carbon dioxide gas is injected into the aqueous solution 162 through the first inlet 112, and a chemical elution reaction of carbon dioxide occurs in the reaction space 161 as shown in the following Reaction Scheme 1.

$$H_2O\ (l) + CO_2\ (g) \rightarrow H^+\ (aq) + HCO_3^-\ (aq) \qquad \text{[Reaction Scheme 1]}$$

That is, the carbon dioxide ($CO_2$) supplied to the reaction space 161 is subjected to a spontaneous chemical reaction with water ($H_2O$) of the aqueous solution 162 to produce a hydrogen cation ($H^+$) and bicarbonate ($HCO_3^-$).

In addition, an electrical reaction occurs in the cathode 118 as shown in the following Reaction Scheme 2.

$$2H^+\ (aq) + 2e^- \rightarrow H_2\ (g) \qquad \text{[Reaction Scheme 2]}$$

That is, the hydrogen cation ($H^+$) receives an electron ($e^-$) around the cathode 118 to generate hydrogen ($H_2$) gas. The generated hydrogen ($H_2$) gas is discharged to the outside through the first outlet 113.

In addition, a complex hydrogen generation reaction occurs around the cathode 118 as shown in the following Reaction Scheme 3.

$$2H_2O\ (l) + 2CO_2\ (g) + 2e^- \rightarrow H_2\ (g) + 2HCO_3^-\ (aq) \text{[Reaction Scheme 3]}$$

In addition, when the anode 158 is made of zinc (Zn), an oxidation reaction occurs in the anode 158 as shown in the following Reaction Scheme 4.

$$Zn + 4OH^- \rightarrow Zn(OH)_4^{2-} + 2e^-\ (E^0 = -1.25\ V)$$

$$Zn(OH)_4^{2-} \rightarrow ZnO + H_2O + 2OH^- \qquad \text{[Reaction Scheme 4]}$$

Therefore, when the anode 158 is made of zinc (Zn), the reaction scheme of the overall reaction occurring in a reaction process is the same as the following Reaction Scheme 5.

$$Zn + 2CO_2 + 2H_2O + 2OH^- \rightarrow ZnO + 2HCO_3^-\ (aq) + H_2\ (g)$$
$$(E^0 = 1.25\ V) \qquad \text{[Reaction Scheme 5]}$$

In addition, when the anode 158 is made of aluminum (Al), an oxidation reaction occurs in the anode 158 as shown in the following Reaction Scheme 6.

$$Al + 3OH^- \rightarrow Al(OH)_3 + 3e^-\ (E^0 = -2.31\ V) \qquad \text{[Reaction Scheme 6]}$$

Therefore, when the anode 158 is made of aluminum (Al), the reaction scheme of the overall reaction occurring in a reaction process is the same as the following Reaction Scheme 7.

$$2Al + 6CO_2 + 6H_2O + 6OH^- \rightarrow 2Al(OH)_3 + 6HCO_3^- \text{ (aq)} +$$
$$3H_2 \text{ (g) } (E^0 = 2.31 \text{ V}) \qquad \text{[Reaction Scheme 7]}$$

In conclusion, as shown in Reaction Scheme 5 and Reaction Scheme 7, the hydrogen ions produced by the elution of carbon dioxide in the aqueous solution 162 during the reaction receive electrons from the cathode 118 and are thus reduced to hydrogen gas, the hydrogen gas is discharged through the first outlet 113, and the metal anode 158 is changed into an oxide form. As the reaction proceeds, bicarbonate ions ($HCO_3^-$) are produced in the aqueous solution 162.

Figure 4:
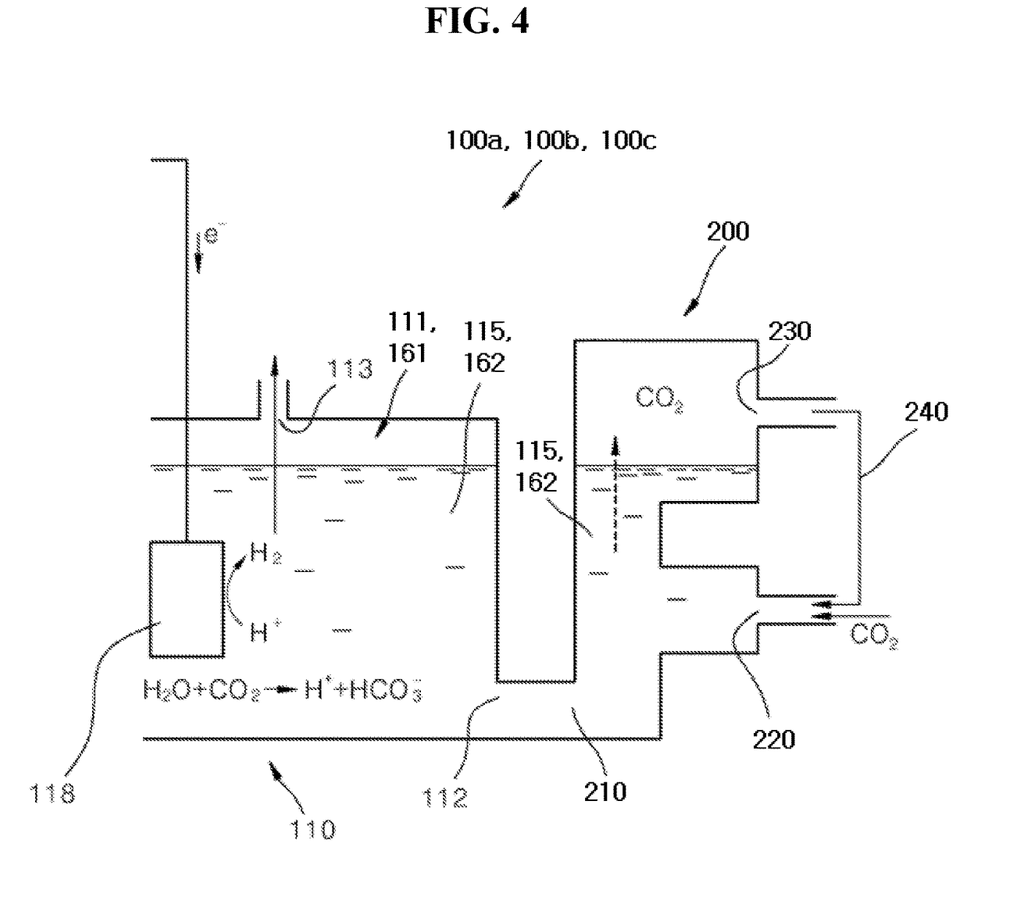
FIG. 4 is a schematic diagram illustrating the operation process of a carbon dioxide utilization system including a carbon dioxide treatment unit according to an embodiment of the present invention.

FIG. 4 is a schematic diagram illustrating the reaction process of a carbon dioxide utilization system including a carbon dioxide treatment unit 200 according to an embodiment of the present invention. Referring to FIG. 4, a carbon dioxide utilization system 100a, 100b, 100c may further include a carbon dioxide treatment unit 200. The carbon dioxide treatment unit 200 contains the same aqueous solution as the first aqueous solution 115 of the cathode unit 110 or the aqueous solution 162 of the reaction space 161. The carbon dioxide treatment unit 200 may include: a connection pipe 210 which allows the cathode unit 110 or the reaction space 161 and the carbon dioxide treatment unit 200 to communicate with each other; a second inlet 220 through which carbon dioxide is introduced; a second outlet 230 positioned at an upper part thereof; and a carbon dioxide circulation supply unit 240. Since the carbon dioxide utilization system 100a, 100b, 100c is the same as those described in the embodiments shown in FIGS. 1 to 3, the detailed description thereof will be omitted.

The second inlet 220 is positioned above the connection pipe 210 and below the second outlet 230 and the water surface of the first aqueous solution 115 or the aqueous solution 162 in the carbon dioxide treatment unit 200. Through the second inlet 220, carbon dioxide gas to be used as a fuel in a reaction process is introduced into the carbon dioxide treatment unit 200. Through the second inlet 220, the first aqueous solution 115 or the aqueous solution 162 may also be supplied as necessary. The second inlet 220 and the first outlet 113 may be selectively opened and closed by a valve or the like during a reaction in a timely manner.

The connection pipe 210 is positioned below the second inlet 220 in the carbon dioxide treatment unit 200, and the carbon dioxide treatment unit 200 communicates with the first accommodation space 111 or the reaction space 161 by the connection pipe 210.

The second outlet 230 is positioned above the second inlet 220 and the water surface of the first aqueous solution 115 or the aqueous solution 162 in the carbon dioxide treatment unit 200. Through the second outlet 230, non-ionized carbon dioxide gas, which has not been dissolved in the first aqueous solution 115 or the aqueous solution 162, is discharged from the carbon dioxide treatment unit 200 to the outside. The carbon dioxide gas discharged through the second outlet 230 is supplied to the second inlet 220 by the carbon dioxide circulation supply unit 240.

The carbon dioxide circulation supply unit 240 is configured to circulate and resupply the carbon dioxide gas discharged through the second outlet 230 to the second inlet 220.

The connection pipe 210 is connected to the first inlet 112 of the first accommodation space 111 or the reaction space 161. Through the connection pipe 210, the first accommodation space 111 or the reaction space 161 and the carbon dioxide treatment unit 200 communicate with each other.

Non-ionized carbon dioxide gas, which has not been dissolved in the first aqueous solution 115 or the aqueous solution 162, of the carbon dioxide introduced into the carbon dioxide treatment unit 200 through the second inlet 220 does not move to the first accommodation space 111 or the reaction space 161, rises, and is collected in a space provided above the water surface of the first aqueous solution 115 or the aqueous solution 162 in the carbon dioxide treatment unit 200. Then, the collected carbon dioxide gas is discharged through the second outlet 230, and the carbon dioxide gas discharged through the second outlet 230 is supplied to the carbon dioxide treatment unit 200 through the second inlet 220 and recycled by the carbon dioxide circulation supply unit 240. In addition, since non-ionized carbon dioxide gas, which has not been dissolved in the first aqueous solution 115 or the aqueous solution 162, of the carbon dioxide introduced into the carbon dioxide treatment unit 200 does not move to the first accommodation space 111 or the reaction space 161, high purity hydrogen, which is not mixed with carbon dioxide, may be discharged through the first outlet 113.

Figure 5:
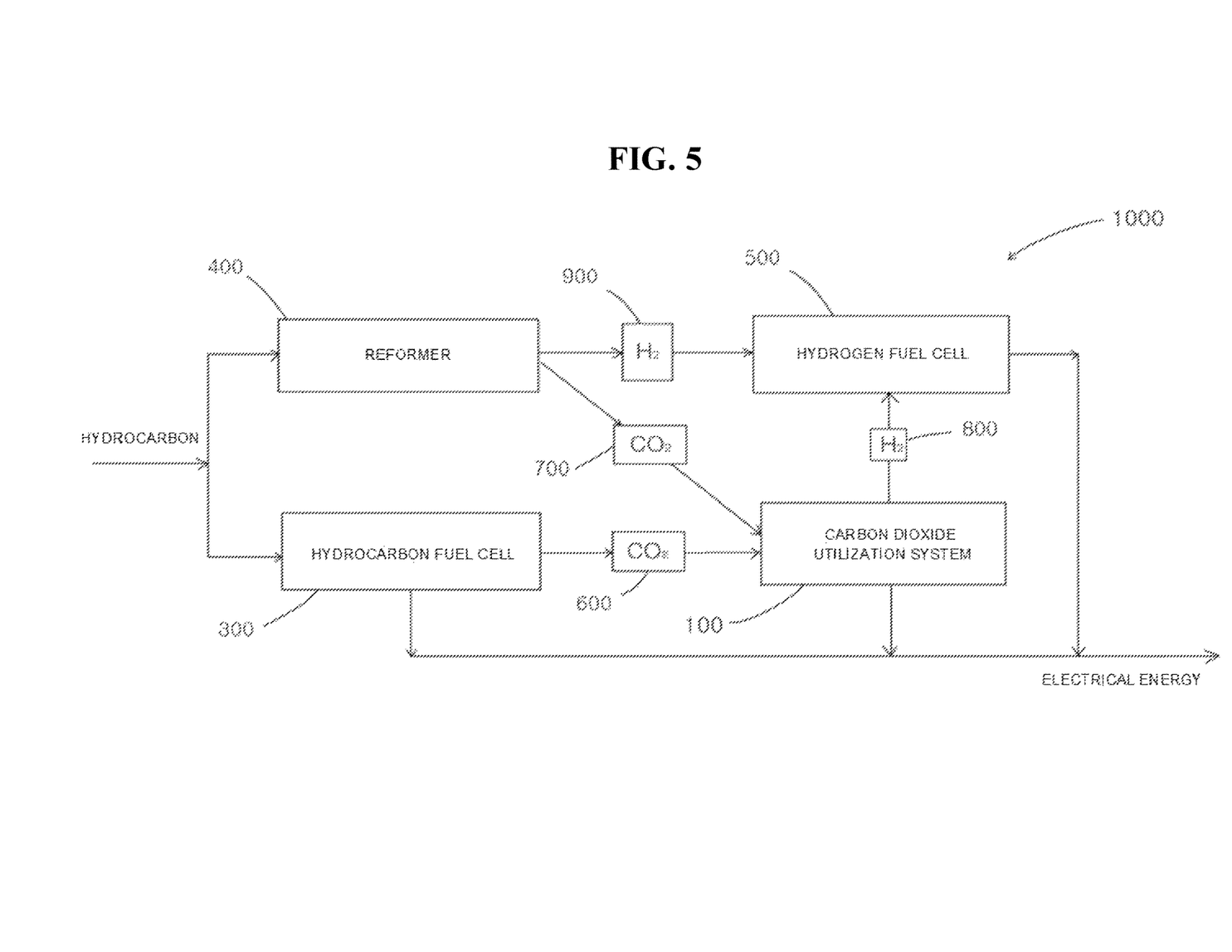
FIG. 5 is a block diagram schematically illustrating the configuration of a complex power generation system including a carbon dioxide utilization system according to an embodiment of the present invention.

FIG. 5 is a block diagram schematically illustrating the configuration of a complex power generation system including a carbon dioxide utilization system according to an embodiment of the present invention. Referring to FIG. 5, the complex power generation system 1000 according to an embodiment of the present invention includes: a carbon dioxide utilization system 100 which produces electrical energy and generates hydrogen by using carbon dioxide as a raw material in a discharge process; a hydrocarbon fuel cell 300 which produces electrical energy and additionally generates carbon dioxide by using a hydrocarbon as a fuel; a reformer 400 which produces hydrogen-rich reformed gas from a hydrocarbon and additionally generates carbon dioxide; a hydrogen fuel cell 500 which produces electrical energy by using hydrogen as a fuel; a first carbon dioxide supply unit 600 configured to supply the carbon dioxide generated in the hydrocarbon fuel cell 300 to the carbon dioxide utilization system 100; a second carbon dioxide supply unit 700 configured to supply the carbon dioxide generated in the reformer 400 to the carbon dioxide utilization system 100; a hydrogen supply unit 800 configured to supply the hydrogen generated in the carbon dioxide utilization system 100 to the hydrogen fuel cell 500; and a reformed gas supply unit 900 configured to supply the reformed gas produced in the reformer 400 to the hydrogen fuel cell 500.

The hydrocarbon fuel cell 300 produces electrical energy and generates carbon dioxide as a by-product by using a hydrocarbon as a fuel. The fuel cell 300 may be a solid oxide fuel cell (SOFC). The carbon dioxide generated in the hydrocarbon fuel cell 300 is supplied to the carbon dioxide utilization system 100 by the first carbon dioxide supply unit 600. A hydrocarbon which is a fuel of the hydrocarbon fuel cell 300 may be any one of methane ($CH_4$), ethane ($C_2H_6$), propane ($C_3H_8$), butane ($C_4H_{10}$), hexane ($C_6H_{14}$), heptane ($C_7H_{16}$), octane ($C_8H_{18}$), nonane ($C_9H_{20}$), and decane ($C_{10}H_{22}$).

The reformer 400 produces hydrogen-rich reformed gas from a hydrocarbon and additionally generates carbon dioxide gas. A hydrocarbon to be reformed by the reformer 400 may be any one of methane ($CH_4$), ethane ($C_2H_6$), propane ($C_3H_8$), butane ($C_4H_{10}$), hexane ($C_6H_{14}$), heptane ($C_7H_{16}$), octane ($C_8H_{18}$), nonane ($C_9H_{20}$), and decane ($C_{10}H_{22}$), and the same as that used as a fuel of the hydrocarbon fuel cell 300 is preferred. In an embodiment, the reformer 400 is described as a methane-water vapor reformer which produces hydrogen (H$_2$) through a reformation reaction of methane (CH$_4$) and water vapor (H$_2$O).

The methane-water vapor reformer 400 occupies a significant portion of the hydrogen production process due to the advantages of inexpensive process costs and enabling mass production. The following Reaction Scheme 8 and Reaction Scheme 9 relate to the reformation reaction in the methane-water vapor reformer 400.

$$CH_4 + H_2O \rightarrow CO + 3H_2 \qquad \text{[Reaction Scheme 8]}$$

$$CO + H_2O \rightarrow CO_2 + H_2 \qquad \text{[Reaction Scheme 9]}$$

That is, methane and water vapor may be chemically reacted to produce carbon monoxide (CO) and hydrogen, and successively, carbon monoxide and water vapor may be chemically reacted to finally produce hydrogen. The hydrogen produced in the methane-water vapor reformer 400 is supplied as a fuel of the hydrogen fuel cell 500 by the reformed gas supply unit 900.

Although the methane-water vapor reformer 400 has the above-described many advantages, as shown in Reaction Scheme 8 and Reaction Scheme 9, water vapor needs to be supplied from the outside for proceeding the process, and carbon dioxide which is the main cause of global warming is inevitably generated as a by-product in the hydrogen production. However, in the case of the present invention, the carbon dioxide generated in the methane-water vapor reformer 400 is not discharged into the atmosphere or transferred for a separate process of capturing and storing carbon dioxide but transferred to the carbon dioxide utilization system 100 by the second carbon dioxide supply unit 700 for operating the carbon dioxide utilization system 100. Therefore, not only the problem of carbon dioxide generation, which is a necessary evil in the operation of the methane-water vapor reformer 400, may be solved, but also a redundant process may be omitted by establishing a system in which the carbon dioxide utilization system 100 and the methane-water vapor reformer 400 are linked. Since the methane-water vapor reformer 400 is a known technology, the detailed description thereof will be omitted.

The hydrogen fuel cell 500 produces water by a chemical reaction of hydrogen and oxygen and also generates electrical energy. In an embodiment, the hydrogen fuel cell 500 is described as a solid oxide fuel cell (SOFC). Despite having many advantages in terms of environmental friendliness, the hydrogen fuel cell 500 needs to receive hydrogen produced in the methane-water vapor reformer 400 and the like. However, in the case of the present invention, since the hydrogen fuel cell 500 is established as one system with the carbon dioxide utilization system 100, the hydrogen fuel cell 500 may receive, as a fuel, hydrogen generated during the discharging process of the carbon dioxide utilization system 100, and thus efficiency may be significantly improved.

The first carbon dioxide supply unit 600 is configured to supply the carbon dioxide, which is generated in the hydrocarbon fuel cell 300, as a raw material for producing hydrogen to the carbon dioxide utilization system 100.

The second carbon dioxide supply unit 700 is configured to supply the carbon dioxide, which is generated as a by-product in the reformer 400, as a raw material for producing hydrogen to the carbon dioxide utilization system 100.

The hydrogen supply unit 800 is configured to supply the hydrogen gas, which is generated as a by-product during the discharging process of the carbon dioxide utilization system 100, as a fuel of the hydrogen fuel cell 500.

The reformed gas supply unit 900 is configured to supply the hydrogen-rich reformed gas, which is produced in the reformer 400, as a fuel of the hydrogen fuel cell 500.

In the embodiment described with reference to FIG. 5, the complex power generation system 1000 is described as having a configuration in which the hydrogen generated in the carbon dioxide utilization system 100 is supplied to the fuel cell 500, but this is merely an embodiment of the present invention. The hydrogen may be supplied to various other devices that use hydrogen in addition to the fuel cell, and this is also included in the scope of the present invention.

In addition, in the embodiment described with reference to FIG. 5, the complex power generation system 1000 is described as including the reformer 400, but the reformer 400 may not be included, and this is also included in the scope of the present invention.

While the present invention has been described above with reference to the exemplary embodiments, the present invention is not limited thereto. It is clear that various modifications may be made without departing from the scope and spirit of the present invention. Therefore, it will be understood by those skilled in the art that these modifications are also included in the scope of the present invention.

According to a carbon dioxide utilization system using carbon dioxide as a fuel and a complex power generation system including the same according to embodiments of the present invention, carbon dioxide can be removed, and hydrogen and sodium hydrogen carbonate can be produced. Therefore, the carbon dioxide utilization system and complex power generation system can be applied to a carbon dioxide-capturing apparatus, a hydrogen generator, a complex power generator, and the like.

The invention claimed is:

1. A carbon dioxide utilization system comprising:
    a cathode unit including a first accommodation space, a first aqueous solution, and a cathode at least partially submerged in the first aqueous solution;
    an anode unit including a second accommodation space, a second aqueous solution which is basic, and a metal anode at least partially submerged in the second aqueous solution; and
    a connection unit configured to connect the cathode unit and the anode unit,
    wherein carbon dioxide introduced into the first aqueous solution is captured as a bicarbonate ion and produces a hydrogen ion, and the hydrogen ion reacts with an electron of the cathode to produce hydrogen.

2. The carbon dioxide utilization system of claim 1, wherein the anode is made of aluminum (Al) or zinc (Zn).

3. The carbon dioxide utilization system of claim 1, wherein the connection unit is a salt bridge.

4. The carbon dioxide utilization system of claim 3, wherein a solution inside the salt bridge contains sodium ions.

5. The carbon dioxide utilization system of claim 1, wherein the connection unit is disposed between the first accommodation space and the second accommodation space and is a porous ion transfer member which blocks the movement of the first aqueous solution and the second aqueous solution and allows the movement of ions.

6. The carbon dioxide utilization system of claim 5, wherein the ion transfer member is made of glass.

7. The carbon dioxide utilization system of claim 5, wherein a pore formed in the ion transfer member has a size of 40 to 90 microns, 15 to 40 microns, 5 to 15 microns, or 1 to 2 microns.

8. The carbon dioxide utilization system of claim 1, wherein the first aqueous solution and the second aqueous solution are aqueous potassium hydroxide solutions, and the connection unit is disposed between the first accommodation space and the second accommodation space and is an ion transfer member which blocks the movement of the first aqueous solution and the second aqueous solution and allows the movement of potassium ions.

9. The carbon dioxide utilization system of claim 1, wherein the first aqueous solution and the second aqueous solution are aqueous potassium hydroxide solutions, and the connection unit is disposed between the first accommodation space and the second accommodation space and is an ion transfer member which blocks the movement of the first aqueous solution and the second aqueous solution and allows the movement of hydroxyl ions.

10. The carbon dioxide utilization system of claim 1, wherein the cathode unit includes a first outlet configured to discharge the produced hydrogen, and the first outlet is positioned above a water surface of the first aqueous solution.

11. The carbon dioxide utilization system of claim 1, further comprising a carbon dioxide treatment unit in communication with the first accommodation space and the first aqueous solution and including a first connection pipe,
wherein the carbon dioxide treatment unit does not allow non-ionized carbon dioxide of the introduced carbon dioxide to be supplied to the cathode unit.

12. The carbon dioxide utilization system of claim 11, wherein the carbon dioxide treatment unit allows the non-ionized carbon dioxide to be separated using a difference in specific gravity with the first aqueous solution in the carbon dioxide treatment unit.

13. The carbon dioxide utilization system of claim 11, wherein the carbon dioxide treatment unit allows the non-ionized carbon dioxide to be collected above a water surface of the first aqueous solution in the carbon dioxide treatment unit.

14. The carbon dioxide utilization system of claim 11, wherein the carbon dioxide treatment unit includes an inlet positioned below a water surface of the first aqueous solution in the carbon dioxide treatment unit and configured to introduce carbon dioxide, and
the first connection pipe is positioned below the inlet.

15. The carbon dioxide utilization system of claim 11, wherein the carbon dioxide treatment unit includes a second outlet positioned above a water surface of the first aqueous solution in the carbon dioxide treatment unit and configured to discharge the non-ionized carbon dioxide.

16. The carbon dioxide utilization system of claim 11, wherein the carbon dioxide treatment unit further includes a carbon dioxide circulation supply unit configured to supply the non-ionized carbon dioxide separated from the first aqueous solution of the first accommodation space to the first aqueous solution in the carbon dioxide treatment unit.

17. A complex power generation system comprising:
the carbon dioxide utilization system of claim 1; and
a hydrocarbon fuel cell which produces electrical energy and generates carbon dioxide as a by-product by using a hydrocarbon as a fuel,
wherein the carbon dioxide utilization system receives the carbon dioxide generated in the hydrocarbon fuel cell to produce hydrogen and a bicarbonate ion.

18. The complex power generation system of claim 17, further comprising a hydrogen-using device which receives the hydrogen produced in the carbon dioxide utilization system.

19. The complex power generation system of claim 18, further comprising a reformer which produces hydrogen-rich reformed gas from a hydrocarbon and additionally generates carbon dioxide,
wherein the reformed gas is supplied to the hydrogen-using device, and the carbon dioxide generated in the reformer is supplied to the carbon dioxide utilization system.

20. The complex power generation system of claim 19, wherein the reformer is a methane-water vapor reformer which produces hydrogen through a reformation reaction of methane ($CH_4$) and water vapor ($H_2O$).

21. The complex power generation system of claim 18, wherein the hydrogen-using device is a hydrogen fuel cell which produces electrical energy by using hydrogen as a fuel.

22. The complex power generation system of claim 21, wherein the hydrogen fuel cell is a solid oxide fuel cell (SOFC).

23. The complex power generation system of claim 17, wherein the hydrocarbon fuel cell is a solid oxide fuel cell (SOFC).

24. The complex power generation system of claim 21, wherein the hydrogen fuel cell is a solid oxide fuel cell (SOFC).

25. A carbon dioxide utilization system comprising:
a reaction space which accommodates an aqueous solution;
a cathode at least partially submerged in the aqueous solution in the reaction space; and
a metal anode at least partially submerged in the aqueous solution in the reaction space,
wherein carbon dioxide introduced into the aqueous solution is captured as a bicarbonate ion and produces a hydrogen ion, and the hydrogen ion reacts with an electron of the cathode to produce hydrogen.

26. The carbon dioxide utilization system of claim 25, wherein the anode is made of vanadium (V), chromium (Cr), manganese (Mn), iron (Fe), cobalt (Co), nickel (Ni), copper (Cu), aluminum (Al), or zinc (Zn).

27. The carbon dioxide utilization system of claim 25, wherein the reaction space includes a first outlet configured to discharge the produced hydrogen, and the first outlet is positioned above a water surface of the aqueous solution.

28. The carbon dioxide utilization system of claim 25, further comprising a carbon dioxide treatment unit in communication with the reaction space and the aqueous solution and including a first connection pipe,
wherein the carbon dioxide treatment unit does not allow non-ionized carbon dioxide of the introduced carbon dioxide to be supplied to the reaction space.

29. The carbon dioxide utilization system of claim 28, wherein the carbon dioxide treatment unit allows the non-ionized carbon dioxide to be separated using a difference in specific gravity with the aqueous solution in the carbon dioxide treatment unit.

30. The carbon dioxide utilization system of claim 28, wherein the carbon dioxide treatment unit allows the non-ionized carbon dioxide to be collected above a water surface of the aqueous solution in the carbon dioxide treatment unit.

31. The carbon dioxide utilization system of claim 28, wherein the carbon dioxide treatment unit includes an inlet positioned below a water surface of the aqueous solution in the carbon dioxide treatment unit and configured to introduce carbon dioxide, and
the first connection pipe is positioned below the inlet.

32. The carbon dioxide utilization system of claim 28, wherein the carbon dioxide treatment unit includes a second outlet positioned above a water surface of the aqueous solution in the carbon dioxide treatment unit and configured to discharge the non-ionized carbon dioxide.

33. The carbon dioxide utilization system of claim 28, wherein the carbon dioxide treatment unit further includes a carbon dioxide circulation supply unit configured to supply the non-ionized carbon dioxide separated from the aqueous solution of the reaction space to the aqueous solution in the carbon dioxide treatment unit.

34. A complex power generation system comprising:
the carbon dioxide utilization system of claim 25; and
a hydrocarbon fuel cell which produces electrical energy and generates carbon dioxide as a by-product by using a hydrocarbon as a fuel,
wherein the carbon dioxide utilization system receives the carbon dioxide generated in the hydrocarbon fuel cell to produce hydrogen and a bicarbonate ion.

35. The complex power generation system of claim 34, further comprising a hydrogen-using device which receives the hydrogen produced in the carbon dioxide utilization system.

36. The complex power generation system of claim 35, further comprising a reformer which produces hydrogen-rich reformed gas from a hydrocarbon and additionally generates carbon dioxide,
wherein the reformed gas is supplied to the hydrogen-using device, and the carbon dioxide generated in the reformer is supplied to the carbon dioxide utilization system.

37. The complex power generation system of claim 36, wherein the reformer is a methane-water vapor reformer which produces hydrogen through a reformation reaction of methane ($CH_4$) and water vapor ($H_2O$).

38. The complex power generation system of claim 35, wherein the hydrogen-using device is a hydrogen fuel cell which produces electrical energy by using hydrogen as a fuel.

39. The complex power generation system of claim 34, wherein the hydrocarbon fuel cell is a solid oxide fuel cell (SOFC).

\* \* \* \* \*